United States Patent [19]

Holtkamp, Jr.

[11] Patent Number: 5,647,170
[45] Date of Patent: Jul. 15, 1997

[54] WATERING WICK FOR POTTED PLANT

[75] Inventor: Reinhold Holtkamp, Jr., Nashville, Tenn.

[73] Assignee: International Plant Breeding AG, Bern, Switzerland

[21] Appl. No.: 561,433

[22] Filed: Nov. 21, 1995

[51] Int. Cl.$^6$ ............................................. A01G 31/02
[52] U.S. Cl. ........................ 47/81; 222/187; 239/145
[58] Field of Search ........................... 222/187; 239/145, 239/44; 47/81 R

[56] References Cited

U.S. PATENT DOCUMENTS

| | | | |
|---|---|---|---|
| 2,943,378 | 7/1960 | Harkenrider | 239/145 |
| 2,975,464 | 3/1961 | Schultz | 222/187 |
| 4,389,815 | 6/1983 | English | 47/81 R |
| 4,434,577 | 3/1984 | Holtkamp | 47/81 |
| 4,932,159 | 6/1990 | Holtkamp, Sr. | 47/81 |
| 4,996,792 | 3/1991 | Holtkamp, Sr. | 47/81 |
| 5,000,383 | 3/1991 | der Heijden | 239/44 |
| 5,111,614 | 5/1992 | Holtkamp, Sr. | 47/81 |
| 5,193,305 | 3/1993 | Holtkamp, Sr. | 47/81 |

FOREIGN PATENT DOCUMENTS

| | | | |
|---|---|---|---|
| 974962 | 10/1950 | France | 222/187 |
| 3272622 | 12/1991 | Japan | 47/81 R |
| 7602449 | 9/1976 | Netherlands | 47/81 R |

*Primary Examiner*—Henry E. Raduazo
*Attorney, Agent, or Firm*—Foley & Lardner

[57] ABSTRACT

A watering wick for a potted plant comprising an upper part adapted to be forced upwardly through an opening in the bottom of the pot so that it is fully positioned in the growing media. The wick includes a lower tail part which is suspended downwardly into a water reservoir. The wick is made of a hydrophilic material which is resiliently compressible, and is inserted in the pot by a special designed insertion tool.

5 Claims, 1 Drawing Sheet

WATERING WICK FOR POTTED PLANT

BACKGROUND OF THE INVENTION

The present invention relates as indicated to a watering wick for a potted plant, and relates more particularly to a wick which can be inserted into an opening formed in the bottom wall of a pot containing a plant and growing media, and locked in such inserted position. The wick transmits water to the growing media by capillary action from a water supply or reservoir into which a portion of the wick is immersed.

A fairly recent commercial development is the miniaturization of potted plants, with plants of certain species being available commercially in pots as small as 1.5 inches. These miniaturized pots make watering of the plants relatively more difficult, and this is particularly true with species of plants such as African violets which prefer bottom watering. Specifically designed containers have been developed for these miniaturized plants, with reference being made to U.S. Pat. Nos. 4,996,792 and 5,111,614.

To facilitate watering potted plants such as African violets from the bottom, the pots are positioned in containers, for example, of the type disclosed in the patents referred to, and are watered from the bottom by water-transmitting wicks which extend upwardly into the growing media of the pot through a hole in the bottom of the pot, and extend downwardly into the water reservoir defined by the bottom of the container. The bottom watering of the plants provides a continuous supply of water or nutrient-enriched water, in the proper amounts. The water supply need be replenished only periodically, which makes a very convenient arrangement for retailers and end users.

In order to maintain the wick in its inserted position in the container, various wick insertion and retaining devices have been developed. In U.S. Pat. No. 4,932,159, the wick is attached to a device which includes a base and a stem having ribs extending rigidly therefrom by means of which the device can be inserted upwardly through an opening formed in the bottom of the pot, and frictionally retained or locked in such position. The upper end of the wick is frictionally retained in a groove formed in the top of the stem, with the base being formed with an opening through which the wick extends downwardly into the water supply.

A further such wick insertion device is disclosed in U.S. Pat. No. 5,193,305. This patented device include a base and a main body portion the top of which is formed with a slot for frictionally retaining the upper end of the wick. The base contains an opening for receiving and retaining the wick, which extends downwardly into the water supply. When properly positioned, the device is locked in place.

Both of the patented arrangements have worked very satisfactorily and have met with commercial success. However, both of the described arrangements require a separate device for receiving the wick and properly positioning the same, along with the wick, within the growing media in the bottom of the pot.

SUMMARY OF THE INVENTION

In accordance with the invention, the wicking system comprises a single piece of flexibly resilient, hydrophilic material. The wick is configured to include a top part which can be inserted upwardly through an opening formed in the bottom of the pot by resiliently compressing such top part, with the top part of the wick in its normal, expanded condition being greater than the diameter of the opening thereby preventing unintentional withdrawal of the top part from its operative position. The wick further includes a bottom or tail section which extends downwardly from the pot opening into the water supply or reservoir whereby water can be supplied to the growing media in the pot by capillary action.

A particular advantage of the present invention is its inexpensive manufacture. The wicking material itself, which must be hydrophilic and is preferably made of a synthetic plastic material such as polyester, can be cut as single pieces from a much larger piece of material. A cutting die can advantageously be used to cut multiple wicks at the same time, as a result of which there is very little waste of material. In view of the particular configuration of the wick and the method of inserting the wick into the growing media in the pot, the wicking system is very inexpensive.

In accordance with a further aspect of the invention, the wick is configured to provide optimum utilization of material and function. In its preferred form, the top part of the wick has a width greater than the diameter of the opening in the pot, and a length or height sufficient to provide the necessary surface area for plant watering. The bottom part or tail of the wick is of a width slightly less than the diameter of the opening in the bottom wall of the pot, and extends downwardly from the pot into the water supply. The width and length of the tail of the wick are determined based on the water requirements of the plant, with the surface area of the tail of the wick being selected such that water in optimum amounts is transmitted through the tail to the top part of the wick by capillary action for transfer to the growing media. The configuration and the dimensions of the wick can be varied as necessary or desired based on the size of the pot and consequently the amount of water to be transmitted by capillary action for optimum growth.

The invention is further characterized by the ease in which the wick can be inserted into the pot. In accordance with the preferred form of the invention, the wick is provided with an opening to receive the tool. The tool preferably comprises a pointed tip which extends through the opening in the wick and through the opening in the bottom of the pot into the growing media. The tip at its bottom merges into a relatively wider blade portion having a width slightly less than the diameter of the hole in the bottom of the pot thereby permitting the blade to extend upwardly into the pot during the wick insertion operation. The surface of the blade at its merge point with the tip is preferably bevelled to provide more pointed contact with the wick material on both sides of the opening in the wick thereby to enhance the forceful penetration of the wick into the growing media by the tool. The blade is supported by a handle of any suitable configuration by means of which the tool can be manipulated. The tip and blade can vary in shape and dimension, although a flat tip and blade are preferred in order to minimally disrupt the growing media, typically peat moss or a composition including peat moss, when the wick is inserted into the media. It has been found that a flat blade is able to penetrate the growing media much easier, when compared to a round shaft, for example, and that the temporarily displaced growing media very quickly adheres to the top part of the wick inserted in the media, thereby quickly establishing transmission of water to the media through the wick.

The wick can be suitably configured to receive the tool. In the preferred form, a circular hole or opening is provided to receive the tip of the tool, although a slot could be provided as well. The tool and wick must cooperatively function so that the top part of the wick is resiliently compressed as it is moved through the relatively smaller opening in the bottom of the pot, with the subsequent release of the tool permitting the top part of the wick to variably expand within the growing media, depending on the resiliency of the soil.

A further advantage of the present invention is the adaptability of the wick system to automatic insertion of the wick into the pot. It is envisioned that wicks could be pre-cut from a band of wicking material just prior to an insertion station at which the wick would be appropriately positioned, and an insertion device moved upwardly, for example, to engage the wick through the slot or opening formed therein, and subsequently moved upwardly into the pot as described. A conveyor system would be able to position plants to the wick insertion station for automatic wick insertion.

These and other objects and features of the invention will become apparent as the following description proceeds a particular reference to the application drawing.

DETAILED DESCRIPTION OF THE PREFERRED EMBODIMENTS

Figure 1:
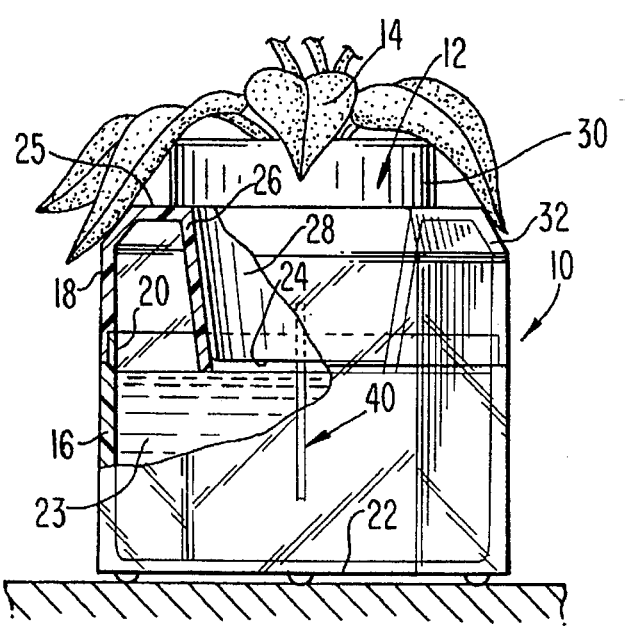
FIG. 1 is a partially-sectioned side elevational view illustrating a potted plant supported in a container, with the wick of the present invention embedded in the growing media in the pot and extending downwardly into the water supply.

There is shown in FIG. 1 a typical plant watering container supporting a pot 12 containing a plant 14. In most respects, the plant watering container is similar in construction and function to the container disclosed and claimed in U.S. Pat. Nos. 5,111,614 and 4,996,792, except for the funnel-shaped supporting section for supporting the pot as will be hereinafter described. The details of the container and pot will be described only in sufficient detail to fully understand the improved wick construction in accordance with the invention.

In the form shown, the container comprises a lower section 16 and an upper section 18 having mating surfaces at their adjoining ends as shown at 20. The lower section 16 includes a bottom wall 22 which defines with the side wall of the section a water reservoir 23. It will be understood that the term "water" as used herein also includes water to which nutrients or the like have been added.

The separate lower and upper sections 16 and 18, respectively, can be maintained separable following assembly, or they can be connected at the meeting area 20 by bonding, sonic welding, or the like.

The upper section 18 includes a top wall 25 including a funnel-shaped pot-supporting section 26 which has a length and is appropriately angled to snugly receive the body portion 28 of the pot 12. The pot further includes a radially enlarged top flange 30 which rests on the top wall 25 when the pot is positioned in the container as shown in FIG. 1. As shown, the upper section 18 is beveled at 32 between the top wall 25 and the side wall thereof so as to provide a supporting surface for the leaves of the plant.

The watering wick in accordance with the present invention is generally indicated at 40 in FIG. 1 and is shown inserted into the growing media in the pot. The upper part of the wick extends upwardly through an opening formed in the bottom of the pot, in a manner to be presently described.

Figure 2:
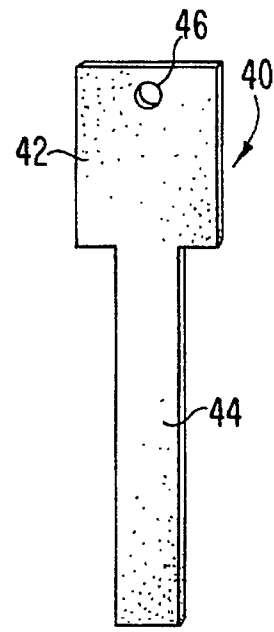
FIG. 2 is a perspective view showing the preferred construction of the wick of the present invention.
Figure 3:
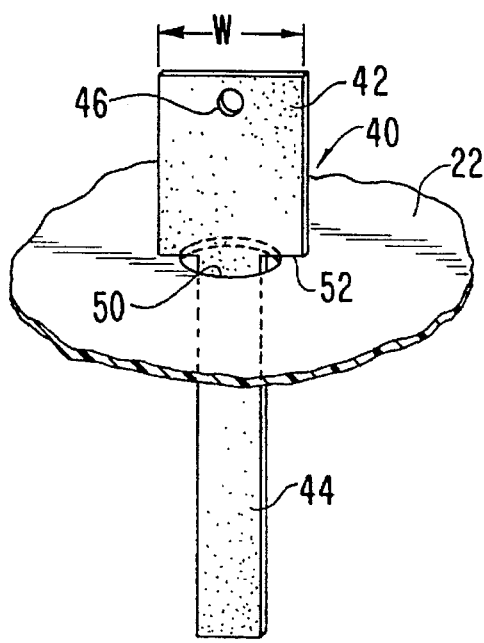
FIG. 3 is a fragmentary section through the bottom wall of the pot, showing the manner in which the wick is positioned within the pot, with the growing media being removed for purposes of clarity.

Referring to FIGS. 2 and 3, the wick 40 includes an enlarged upper part 42 and a lower tail part 44. In the form shown, the upper part 42 is generally rectangular, although the precise shape of the upper part is not critical. Rather, it is the area of the upper part which is important since water is transmitted to the growing media through such upper part, to which the growing media closely adheres. The lower part 44 depends downwardly into the water reservoir, and the total area of the lower part 44 is correlated with the area of the upper part 42, and also with the size of the pot, to transmit optimum amounts of water to the plant by capillary action. For example, FIG. 1 shows a miniaturized pot which requires less water than a larger pot. Several different wick sizes can be provided and the proper size utilized depending upon pot size.

An important feature of the present invention is the ability to achieve the water transfer by the wick by itself, rather than using a wick carried by a separate wick holder which in turn is inserted into the bottom of the pot. The material from which the wick is made must necessarily be hydrophilic, and there are several materials which possess that characteristic. For example, a cotton material could be used although cotton has a relatively short life span. A synthetic plastic material is preferred, and non-woven polyester has proved very satisfactory in use. The density and thickness of the material can be selected as desired to provide the proper amount of water transfer to the plant.

Referring to FIG. 3, the bottom wall 22 of the container is formed with at least one opening 50 through which the wick extends, although a plurality of openings and wicks could be provided depending upon the size of the pot and the water needs of the plant.

The upper part 42 of the wick is substantially wider than the diameter of opening 50 so that insertion of the upper part 42 of the wick completely upwardly through the opening into the growing media prevents subsequent unintentional dislodgement of the wick. The wick material is flexibly resilient which permits the upper part 42 to be flexibly compressed during insertion of the upper part 42 upwardly through the opening into the pot. When the lower edge 52 of the upper part of the wick clears the opening 50, the upper part 42 expands sufficiently so that those portions of the bottom edge extending on either side of the opening 50 prevent unintentional withdrawal of the wick through the opening. Although the upper part 42 of the wick is shown flat in FIG. 3, it will be understood that it will be variably configured depending on the media content. Where the resiliency of the media or soil is greater than the resiliency of the upper part 42 of the wick, it will variably expand from its compressed configuration passing through the opening 50.

The width of the lower tail part 44 of the wick is less than the diameter of the opening 50 so that the tail is suspended freely through the opening into the water reservoir. The upper part 42 of the wick is formed with an opening 46 for receiving an insertion tool as will be presently described.

Although the wick 40 could be simply dropped into an empty pot prior to filling the same with growing media and the plant, this is not practical for several reasons, the most important of which is that the maximum surface area contact between the upper part of the wick and the growing media would not be established.

Figure 4:
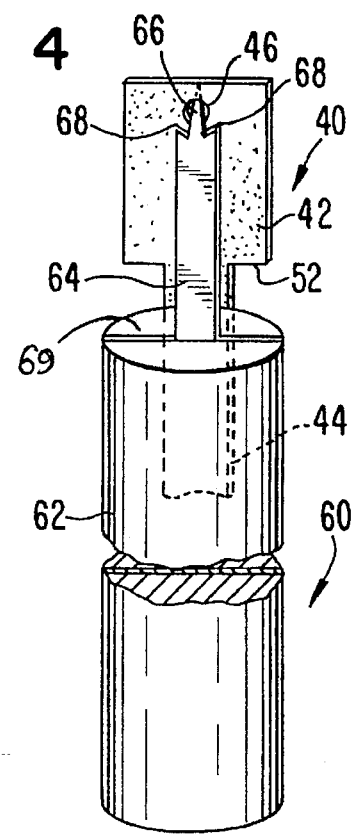
FIG. 4 is a perspective view of the preferred wick inserting tool and wick, illustrating how the wick is engaged by the tool for insertion into the pot.

A suitable tool for inserting the wick into the media-filled pot is illustrated in FIG. 4. The tool is generally indicated at 60 and includes a handle 62, a blade section 64 which can be imbedded in or secured to the handle by rivets or the like, and a pointed outer tip section 66. At the juncture of the tip with the blade, beveled shoulders 68 are formed on either side of the tip to provide a more pointed contact of the tool with the wick. The wick 40 is inserted by the tool into the pot through the opening 50 in the following manner. The pointed tip 66 is extended through the opening 46 until the beveled shoulders 68 engage the surface of the wick. The tip 66 is then inserted upwardly through the opening 50 into the growing media, along with the upper part 42 of the wick which is flexibly compressed as it passes through the opening. The shoulders 68 enhance the contact of the wick by the tool.

The thinness of the blade causes minimal disruption of the media and potential damage to the plant roots. The blade and wick are advanced upwardly until the lower edge 52 of the upper part 42 clears the opening 50, at which time the tool is released and withdrawn. The blade thus forms a slotted opening in the media to receive the upper part of the wick. The slot formed by the upward penetration of the blade into the growing media ensures that, when the blade is removed, intimate contact is made between the growing media and the surfaces of the upper part 42 of the wick. Such contact is important since the water transmitted to the growing media through the upper part of the wick largely depends upon the surface contact area of the wick.

The width of the blade 64 is preferably slightly less than the diameter of the opening 50 so that the blade fits relatively snugly through the opening. The length of the blade, that is, the distance from the shoulders 68 to the area where the blade enters the handle 62, is slightly greater than the height of the top portion 42 of the wick. Thus, the upper part 42 of the wick will be fully inserted (see FIG. 3) when the top surface 69 of the handle contacts the bottom surface of the bottom wall 22 of the pot. If the blade 64 is too long, the upper part 42 of the wick 42 could be inserted too far into the growing media, thus reducing the surface area of the tail part 44 of the wick exposed to the water supply. On the other hand, if the blade 64 is too short, the upper part 42 of the wick will not be fully inserted through the opening 50 as described. It has been determined that a blade length approximately one-fourth inch longer than the length of the upper part 42 of the wick will function to make certain that the upper part 42 clears the opening 50 while at the same time preventing movement of the upper part of the wick significantly beyond the FIG. 3 position of the wick.

It will be understood that the size of both the wick and the blade of the tool may vary considerably depending upon the size of the pot and the pot opening. If a wick is to be used with a four inch pot, for example, as opposed to a miniaturized pot as shown in FIG. 1, the wick would be substantially greater in size, and more than one wick may be required. The length of the blade 64 of the tool would then correspond to but be slightly greater than the length or height of the upper part 42 of the wick, and the width of the blade would be somewhat greater to accommodate the larger diameter of the pot opening. In other words, the tool can be dimensioned to accommodate a particular pot and wick size.

After the wick has been inserted in the manner described, the pot is ready to be mounted in the container as shown in FIG. 1. The funnel-shaped section 26 of the upper section 18 of the container snugly receives the side wall of the pot so as to support the same in a very stable manner. In addition, the funnel-shape mounting prevents the spilling of water in the event the container is inadvertently tipped on its side.

When the plant is positioned as shown in FIG. 1, the tail 44 extends into the reservoir so that the plant is self-watered from the bottom. This greatly facilitates maintaining the plant during the shipping process, with the supply of water in the reservoir normally lasting several days. The water can be replenished as necessary.

Although manual insertion of the wick into the pot has been described and illustrated, it will be understood that the process could be automated by conveying each pot to a work station to which a wick could be fed and inserted into the pot by a reciprocating tool, similar to the tool shown in FIG. 4. This would have the advantage of substantially reducing labor costs.

Minor changes or departures from the foregoing description will suggest themselves to those skilled in the art without, however, departing from the spirit of the invention as defined in the appended claims.

What is claimed is:

1. A watering wick made of flexible hydrophilic material for transmitting liquid by capillary action from a liquid reservoir defined by a container to growing media in a pot containing at least one opening in its bottom wall and being supported in the container, said wick comprising:

an upper enlarged part having a width greater than the dimension of a bottom wall opening through which the upper part is inserted so that said upper part is compressed in width during insertion through such opening, said upper part thereafter assuming a width larger than the size of such opening so as to prevent unintentional withdrawal of the wick downwardly through such opening, and a lower tail part formed integrally with said upper part, said tail part having a width less than the dimension of such opening and a length such that the tail part extends substantially below such opening into a liquid reservoir, and wherein the thickness of said wick, and the length and width of said upper part and said lower tail part are such that an amount of liquid appropriate for watering a plant is transmitted by said lower tail part of said wick to said upper part thereof.

2. The wick of claim 1, wherein said upper part of said wick is formed with an opening by means of which the wick can be engaged by a wick insertion tool for forcing said upper part of such wick through such opening.

3. The wick of claim 1, wherein said wick material is non-woven polyester.

4. The combination of a pot containing a plant growing in media in the pot and having at least one opening formed in the bottom wall of the pot, and a watering wick made of flexible hydrophilic material for watering said plant by capillary action from a reservoir, said wick comprising:

an upper enlarged part adapted to be inserted upwardly through said opening in the bottom wall of the pot, the width of said upper part being greater than the dimension of said opening so that upper part is compressed in width during insertion through said opening, said upper part thereafter assuming a width larger than the diameter of said opening so as to prevent unintentional withdrawal of the wick downwardly through the opening, and a lower tail part formed integrally with said upper part, said tail part having a width less than the diameter of said opening and extending below said opening into a liquid reservoir, and wherein the thickness of said wick, and the length and width of said upper part and said lower tail part are such that an amount of liquid appropriate to water the plant is transmitted by said lower tail part of said wick to said upper part thereof and consequently to the growing media and the plant.

5. The combination of claim 4, wherein said wick material is non-woven polyester.

* * * * *